(12) United States Patent
Zhao et al.

(10) Patent No.: US 10,890,669 B2
(45) Date of Patent: Jan. 12, 2021

(54) FLEXIBLE X-RAY DETECTOR AND METHODS FOR FABRICATING THE SAME

(71) Applicant: General Electric Company, Schenectady, NY (US)

(72) Inventors: Ri-an Zhao, Niskayuna, NY (US); Aaron Judy Couture, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/596,234

(22) Filed: Jan. 14, 2015

(65) Prior Publication Data
US 2016/0204164 A1 Jul. 14, 2016

(51) Int. Cl.
*G01T 1/20* (2006.01)

(52) U.S. Cl.
CPC .................................. *G01T 1/2018* (2013.01)

(58) Field of Classification Search
CPC .... G01T 1/2018; H01L 27/308; H01L 27/307
USPC ..... 250/369, 361 R, 363.02, 370.11; 257/40, 257/E27.14
See application file for complete search history.

(56) References Cited

U.S. PATENT DOCUMENTS

| | | | | |
|---|---|---|---|---|
| 4,735,847 A * | 4/1988 | Fujiwara | | H01R 4/04 428/209 |
| 5,912,943 A * | 6/1999 | Deucher | | H05G 1/02 378/167 |
| 6,031,888 A * | 2/2000 | Ivan | | A61B 6/4441 378/196 |
| 7,521,292 B2 * | 4/2009 | Rogers | | B82Y 10/00 257/40 |
| 7,557,367 B2 * | 7/2009 | Rogers | | B82Y 10/00 257/40 |
| 2002/0076844 A1 * | 6/2002 | Possin | | H01L 27/14609 438/30 |
| 2003/0031296 A1 | 2/2003 | Hoheisel | | |
| 2004/0016886 A1 | 1/2004 | Ringermacher et al. | | |

(Continued)

FOREIGN PATENT DOCUMENTS

EP 2372788 A2 10/2011
JP 201568644 4/2015

(Continued)

OTHER PUBLICATIONS

Takahashi et al., "Carbon Nanotube Active-Matrix Backplanes for Mechanically Flexible Visible Light and X-Ray Imagers", Nano Letters, vol. 13, Issue 11, Abstract—1 Page, 2013.

Happich, "Large-Area Fully-Organic Flexible Photodetector Array Targets X-Ray Imaging", EE times Web Article IMEC and Holst Centre, http://www.electronics-eetimes.com/en/large-area-fully-organic-flexible-photodetector-array-targets-x-ray-imaging.html?cmp_id=7&news_id=222917221, 8 Pages, Jun. 2013.

(Continued)

*Primary Examiner* — Blake C Riddick (57) ABSTRACT

A flexible organic X-ray detector, an imaging system including the flexible organic detector and methods for fabricating a flexible organic X-ray detector having a layered structure are presented. The detector includes a flexible substrate and a thin glass substrate operatively coupled to the flexible substrate. Further, the detector includes a thin film transistor array disposed on the thin glass substrate. Additionally, the detector includes an organic photodiode including one or more layers disposed on the thin film transistor array. Moreover, the detector includes a scintillator layer disposed on the organic photodiode.

19 Claims, 4 Drawing Sheets

(56) References Cited

U.S. PATENT DOCUMENTS

| | | | |
|---|---|---|---|
| 2004/0238750 A1* | 12/2004 | Vafi | G01T 1/2018 |
| | | | 250/370.11 |
| 2005/0117197 A1* | 6/2005 | Ide | G02F 1/1333 |
| | | | 359/291 |
| 2009/0166512 A1* | 7/2009 | Furst | B82Y 10/00 |
| | | | 250/208.1 |
| 2010/0061508 A1 | 3/2010 | Takahashi | |
| 2011/0064953 A1 | 3/2011 | O'Rourke et al. | |
| 2011/0095266 A1* | 4/2011 | Hayden | B82Y 30/00 |
| | | | 257/21 |
| 2011/0140100 A1 | 6/2011 | Takata et al. | |
| 2012/0217404 A1 | 8/2012 | Iwakiri et al. | |
| 2013/0344654 A1* | 12/2013 | Limousin | H01L 24/11 |
| | | | 438/108 |
| 2015/0137088 A1* | 5/2015 | Simon | H01L 27/308 |
| | | | 257/40 |

FOREIGN PATENT DOCUMENTS

| | | | |
|---|---|---|---|
| JP | 2015068644 A | * | 4/2015 |
| WO | 2013190434 A1 | | 12/2013 |
| WO | 2015138329 A1 | | 9/2015 |

OTHER PUBLICATIONS

Salas-Villasenor et al., "Transparent and Flexible Thin Film Transistors with Solution-Based Chalcogenide Materials", ECS Journal of Solid State Science and Technology, vol. 3, Issue 4, Abstract—1 Page, 2014.

PCT Search Report and Written Opinion issued in connection with corresponding PCT Application No. PCT/2016/013036 dated Apr. 20, 2016.

JP patent application 2017-536949 filed Jul. 12, 2017—Preliminary Rejection dated Nov. 6, 2019—English translation; 7 pages.

JP2015068644A-D1—Abstract—English translation; 1 page.

* cited by examiner

FLEXIBLE X-RAY DETECTOR AND METHODS FOR FABRICATING THE SAME

BACKGROUND

Embodiments of the present specification relate generally to digital X-ray detectors, and more particularly to methods for fabricating flexible organic X-ray detectors on thin glass substrates.

Radiographic imaging systems typically include a radiation source and a detector for use in visualizing an internal structure of a subject such as a patient or a piece of luggage. Particularly, radiographic imaging systems such as an X-ray imaging system or a computed tomography (CT) imaging system may include a radiation source that is configured to generate electromagnetic radiation such as X-rays that pass through a subject to impinge upon an array of detector elements in a digital X-ray detector.

Certain digital X-ray detectors include a scintillator disposed over a photodetector that converts the impinging radiation to low-energy photons that are suitable for detection by the photodetector. The photodetector, in turn, produces a separate electrical signal that is indicative of X-rays detected at a corresponding location of the detector element. The electrical signals are then collected, digitized, and transmitted to a data processing system for analysis and reconstruction of an image of the subject.

Generally, the photodetectors may include an organic photodiode (OPD) to allow for low cost digital radiography and fabrication of rugged, lightweight and portable detectors. Conventionally, in the digital X-ray detector, the OPDs are fabricated on a thin film transistor (TFT) array backplane panel. The TFT panel, in turn, may be processed on a flexible plastic substrate to allow attachment of the digital X-ray detectors on desired surfaces having different shapes and sizes.

However, fabrication of the TFT panel on the plastic substrate entails movement of the flexible substrate through several machines, ovens, and/or cleaning steps. Accordingly, the flexible substrate is temporarily laminated on a rigid substrate to survive the movement, and is subsequently released after TFT deposition. The relatively high coefficient of thermal expansion (CTE) for flexible plastic substrates compared to the rigid inorganic silicon or glass substrates, however, leads to significant CTE induced strain mismatch during the TFT processing. The CTE induced strain mismatch may cause significant distortion, in turn, leading to handling errors, photolithographic alignment errors, and/or line or layer defects.

Accordingly, in certain X-ray detectors, the TFT panel may be processed on a glass substrate with thickness of about 0.5 millimeters (mm) to about 1.1 mm. However, use of the glass substrate results in higher weight, while also limiting the flexibility of the X-ray detector. Attempts to reduce the weight of the X-ray detector through use of a thinner glass substrate impede stability of the X-ray detector. Additionally, it is difficult to process the TFT and/or the OPD layers over the thin glass substrate without suitable protection and/or mechanical support, thus hindering mass production of X-ray detectors having desired weight and dimension stability.

BRIEF DESCRIPTION

In accordance with an aspect of the present specification, a flexible organic X-ray detector is presented. The detector includes a flexible substrate and a thin glass substrate operatively coupled to the flexible substrate. Further, the detector includes a thin film transistor array disposed on the thin glass substrate. Additionally, the detector includes an organic photodiode including one or more layers disposed on the thin film transistor array. Moreover, the detector includes a scintillator layer disposed on the organic photodiode.

In accordance with another aspect of the present specification, a method for fabricating an organic X-ray detector having a layered structure is disclosed. The method includes fabricating a thin film transistor array on a glass substrate. Further, the method includes thinning the glass substrate. Moreover, the method includes bonding the thin glass substrate to a flexible substrate. Additionally, the method includes disposing an organic photodiode comprising one or more layers on the thin film transistor array. Furthermore, the method includes disposing a scintillator layer on the organic photodiode.

In accordance with a further aspect of the present specification, another method for fabricating an organic X-ray detector having a layered structure is disclosed. The method includes disposing a thin film transistor array on a glass substrate. Further, the method includes disposing an organic photodiode comprising one or more layers on the thin film transistor array. Moreover, the method includes thinning the glass substrate having the thin film transistor array and the organic photodiode disposed thereon. Additionally, the method includes bonding the thin glass substrate to a plastic substrate. Further, the method also includes disposing a scintillator layer on the organic photodiode.

In accordance with certain other aspects of the present specification, an imaging system for imaging a subject is presented. The system includes an organic X-ray detector configured to acquire imaging data from a target volume in the subject. The detector includes a flexible substrate and a thin glass substrate operatively coupled to the flexible substrate. Further, the detector includes a thin film transistor array disposed on the thin glass substrate. Additionally, the detector includes an organic photodiode including one or more layers disposed on the thin film transistor array. Moreover, the detector includes a scintillator layer disposed on the organic photodiode. Furthermore, the system includes a processing subsystem configured to reconstruct an image of the subject based on the imaging data acquired by the detector.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The following description presents semiconductor devices that include a thin glass substrate and a method for fabricating the same. Particularly, the embodiments described herein disclose a flexible detector that includes an organic photodiode (OPD) fabricated on a thin film transistor (TFT) array, which in turn, is disposed on a thin glass substrate. Additionally, the present embodiments describe a method for fabricating the flexible detector over the thin glass substrate without impeding mechanical robustness and/or handling capability of the flexible detector during the OPD fabrication process. As used herein, the term "thin glass substrate" may be used to refer to a glass substrate having a thickness of about 0.05 millimeters (mm) to about 0.2 mm.

Additionally, as used herein, the term "fabricate" and variations thereof may be used to refer to deposition, patterning with photolithography, etching, annealing, and/or other semiconductor device process steps. Further, in the present specification, when a layer in a semiconductor device is being described as "fabricated on" or "disposed on" another layer or substrate, it is to be understood that the layers may be in direct contact with each other or may include one or more layers or features therebetween. Moreover, it may be noted that as used herein, the term "on" describes a relative position of the layers to each other and may not necessarily mean "on top of" another layer since a relative position above or below may depend upon an orientation of the flexible detector with respect to a viewer.

In the present specification, exemplary embodiments of the flexible detector are described in the context of a flexible OPD used in a radiographic imaging system. However, it will be appreciated that use of the present flexible detector in various other imaging applications and systems such as X-ray projection imaging systems, X-ray diffraction systems, microscopes, digital cameras, and charge-coupled devices is also contemplated. An exemplary environment that is suitable for practising various implementations of the present system is described in the following sections with reference to FIG. 1.

Figure 1:
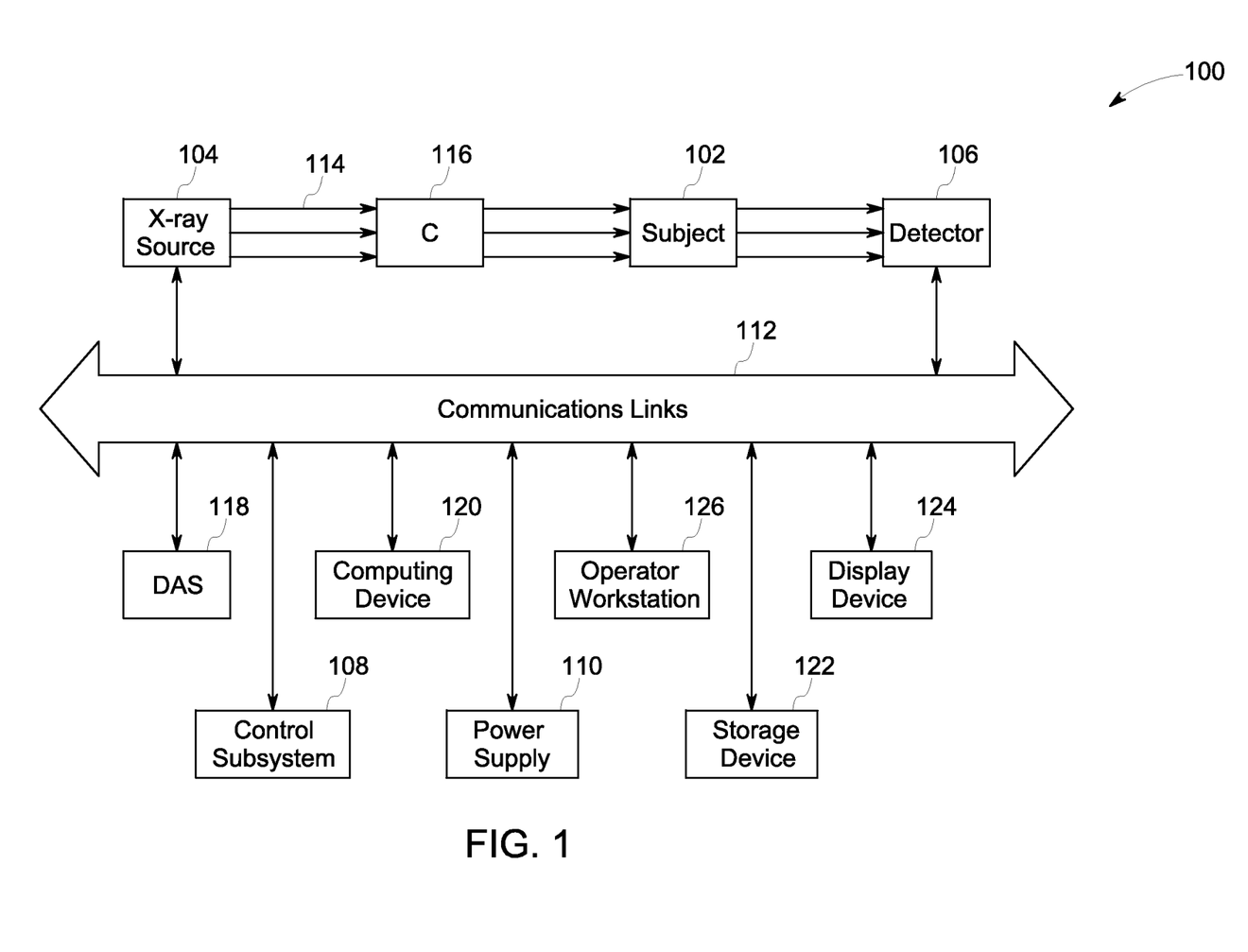
FIG. 1 is a block schematic diagram of an imaging system.

FIG. 1 illustrates an exemplary imaging system 100 for imaging a subject 102 such as a patient or a non-biological object. In certain embodiments, the system 100 may include an X-ray radiation source 104 and a detector 106 that are configured to acquire projection data. Additionally, the system 100 may also include a control subsystem 108 that is configured to provide power and timing signals for controlling operation of the radiation source 104 and the detector 106. Particularly, the control subsystem 108 may be configured to provide the power and timing signals to the radiation source 104 and/or the detector 106 via use of a power supply 110 and one or more wired and/or wireless communications links 112, respectively. The communications links 112, for example, may correspond to a backplane bus, a local area network, a wide area network, and/or the Internet.

Further, in certain embodiments, the radiation source 104 may be configured to project X-ray radiation 114 towards a desired region of interest (ROI) in the subject 102 under control of the control subsystem 108. Particularly, in one embodiment, the radiation source 104 may be positioned adjacent to a collimator 116 that may be configured to collimate the X-ray radiation 114 towards the desired ROI in the subject 102. At least a portion of the X-ray radiation 114 may be attenuated by the subject 102 and may be incident on the detector 106.

In certain embodiments, the detector 106 may be configured to convert the incident X-ray radiation 114 to electrical signals using optical conversion, direct conversion, and/or any other suitable detection technique. Particularly, in one embodiment, the detector 106 may include a scintillator (not shown in FIG. 1) that may be configured to convert the incident X-ray radiation 114 to optical photons. The optical photons, in turn, may be converted to electrical signals by using one or more photosensors and/or photodiodes (not shown in FIG. 1). Alternatively, the detector 106 may be configured to directly convert the incident X-ray radiation 114 into proportional electrical signals. Certain exemplary configurations of the detector 106 that may allow for efficient detection and processing of the X-ray radiation 114 into electrical signals for use in desired image reconstruction will be described in greater detail with reference to FIG. 2.

Further, in certain embodiments, the system 100 may include a data acquisition subsystem (DAS) 118 that may be configured to sample and convert the electrical signals generated by the detector 106 to digital signals. Additionally, the DAS 118 may be configured to transmit the digital signals to a computing device 120 for further processing. The computing device 120, for example, may include one or more application-specific processors, graphical processing units, digital signal processors, microcomputers, microcontrollers, Application Specific Integrated Circuits (ASICs), Field Programmable Gate Arrays (FPGAs), or other suitable processing devices.

Moreover, in one embodiment, the computing device 120 may be configured to store the digitized signals in a storage device 122. The storage device 122, for example, may include as a hard disk drive, a floppy disk drive, a compact disk-read/write (CD-R/W) drive, a Digital Versatile Disc (DVD) drive, a flash drive, and/or a solid-state storage device. Although, FIG. 1 depicts the storage device 122, the computing device 120, the DAS 118, and the control subsystem 108 as separate devices, in certain embodiments, one or more of these may be combined into a single device for efficient use of floor space and/or to satisfy desired imaging requirements.

Further, in certain embodiments, the computing device 120 may be configured to use the digitized signals to reconstruct one or more desired images and/or determine useful diagnostic information corresponding to the subject 102. Additionally, the computing device 120 may be configured to transmit the reconstructed images and/or the diagnostic information to a display device 124 that is coupled to an associated operator workstation 126. In one embodiment, the operator workstation 126 allows a user to receive and evaluate the reconstructed images. Additionally, in certain embodiments, the operator workstation 126 may include a user interface to allow the user to input one or more scanning parameters and/or request for desired diagnostic information and/or images for assessing internal structure and/or functioning of the subject 102.

Generally, a quality of the reconstructed images may depend upon scanning parameters and a detection efficiency of the detector 106. Additionally, utility of the images may depend upon an ability of the radiation source 104 and the detector 106 to acquire projection data corresponding to challenging regions, for example, small or irregularly shaped ROIs of the subject 102. Conventional radiographic imaging systems include fixed and/or rigid sources and/or detectors that may not allow for optimal imaging of such challenging regions. Accordingly, the system 100 employs the detector 106 that may include one or more OPDs and TFT layers (not shown in FIG. 1) disposed over a thin and flexible glass substrate (not shown in FIG. 1) that may conform to different shapes for efficiently imaging challenging regions. An exemplary configuration of the flexible yet dimensionally stable detector 106 that may be suitably coupled to the subject 102 to allow for efficient imaging of challenging ROIs in the subject 102 is described in greater detail with reference to FIG. 2.

Figure 2:
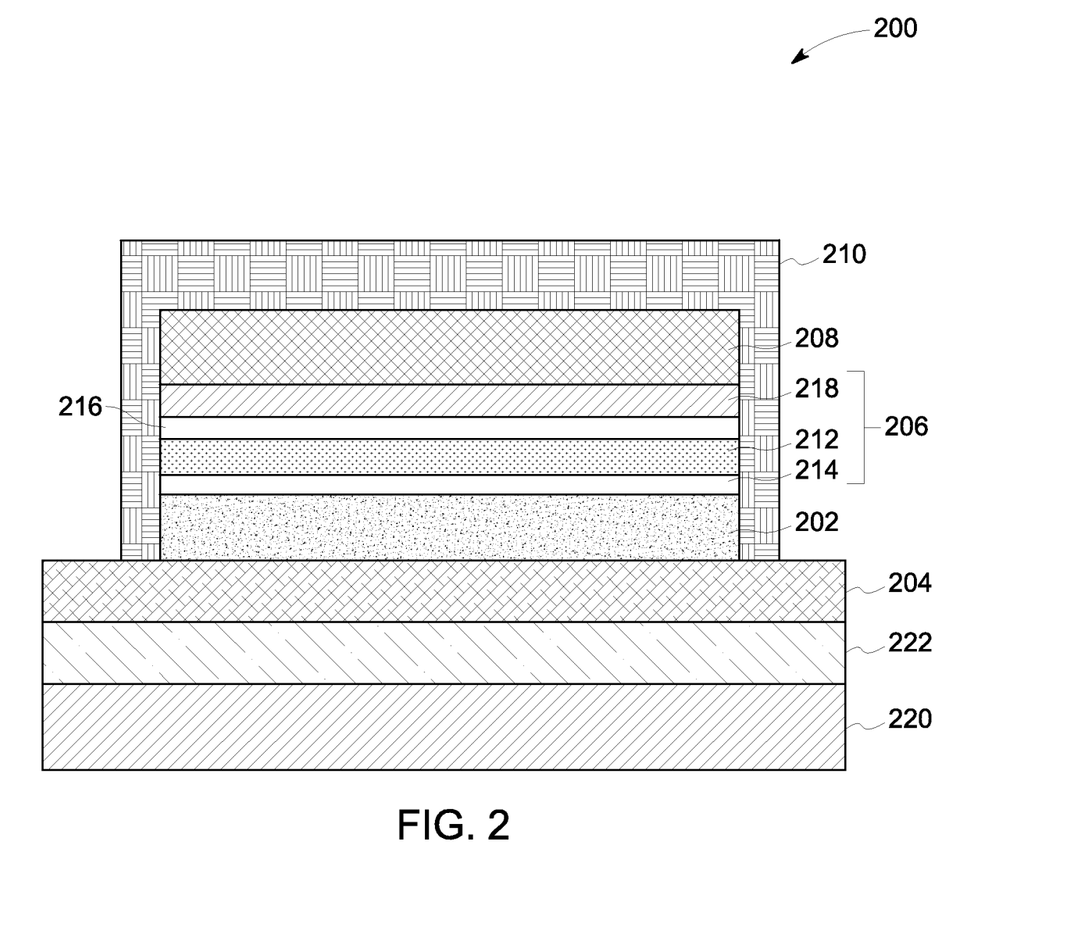
FIG. 2 is a schematic diagram illustrating an exemplary configuration of a digital X-ray detector, in accordance with aspects of the present specification.

FIG. 2 depicts a schematic view of an exemplary embodiment of a flexible digital X-ray detector 200 for use in medical and/or non-medical imaging of a subject such as the subject 102 of FIG. 1. Particularly, in certain embodiments, the detector 200 includes a plurality of layers, each of which facilitates detection of X-ray radiation incident on the detector 200. For example, in one embodiment, the detector 200 may include a thin film transistor (TFT) array backplane 202 that is disposed on a thin glass substrate 204. Additionally, the detector 200 may include a photodetector assembly 206 that is fabricated on the TFT array backplane 202. Further, the detector 200 may also include a scintillator layer 208 disposed on the photodetector assembly 206. Additionally, in certain embodiments, the detector 200 may include a detector seal cover 210 that may be adapted to protect the plurality of layers of the detector 200 from environmental factors such as moisture and/or air that may cause degradation.

According to certain aspects of the present specification, a flexibility and/or durability of the detector 200 may depend upon robustness of the thin glass substrate 204 on which plurality of layers of the detector 200 are fabricated. Therefore, in order to allow for fabrication of the flexible yet robust detector 200, in certain embodiments, the TFT array backplane 202 may initially be fabricated on the glass substrate 204 having a conventional thickness of about 0.5 to about 1.1 mm Particularly, use of the thicker glass substrate 204 allows for greater stability of the detector 200 during the high temperature TFT fabrication process.

In one embodiment, the TFT fabrication process entails fabricating a two-dimensional (2D) array of passive or active pixels on an active layer (not shown) formed of amorphous silicon, an amorphous metal oxide, and/or organic semiconductors. Certain examples of suitable amorphous metal oxides for use in the TFT array backplane 202 include zinc oxide, zinc tin oxide, indium oxides, indium zinc oxides (In—Zn—O series), indium gallium oxides, gallium zinc oxides, indium silicon zinc oxides, and/or indium gallium zinc oxides (IGZO). The IGZO materials, in turn, may include $InGaZnO_4$ and $InGaO_3(ZnO)_m$, where m<6. Further, suitable organic semiconductors, for example, may include conjugated aromatic materials, such as rubrene, tetracene, pentacene, perylenediimides, tetracyanoquinodimethane and/or polymeric materials. The polymeric materials, in turn, may include materials such as polythiophenes, polybenzodithiophenes, polyfluorene, polydiacetylene, poly (2,5-thiophenylene vinylene) poly(p-phenylene vinylene), and/or corresponding derivatives.

Subsequent to the fabrication of the TFT array backplane 202, in one embodiment, the photodetector assembly 206 may be directly fabricated on the TFT array backplane 202. Particularly, in certain embodiments, the photodetector assembly 206 may include an OPD 212 that includes one or more organic layers that are coated on the TFT array backplane 202 using suitable coating techniques. By way of example, the suitable coating techniques may include spin coating, inkjet printing, gravure printing, dip coating, and/or slot die coating.

Further, in certain embodiments, the OPD 212 may include a first electrode 214 and a second electrode 216. Additionally, in one embodiment, the OPD 212 may include one or more materials that produce charged carriers between the first electrode 214 and the second electrode 216 following conversion of incident X-ray radiation to optical photons by the scintillator layer 208. By way of example, the OPD 212 may include at least one donor material such as, but not limited to, copper phtalocyanine (CuPc), (6,6)phenyl-C61-butyric acid methyl ester (PCBM), and/or low bandgap polymers. Specifically, in one embodiment, the low bandgap polymers having LUMO (lowest unoccupied molecular orbital) levels ranging from approximately 1.9 electron Volt (eV) to approximately 4.9 eV and HOMO (highest occupied molecular orbital) levels ranging from approximately 2.9 eV to approximately 7.0 eV may be selected as the donor material. Additionally, the OPD 212 may also include an acceptor material such as, but not limited to, 3,4,9,10-perylene tetracarboxylic bisbenzimidazole (PTCBI), poly(2-methoxy-5-(3',7' dimethyloctyloxy) 1,4, phenylene-vinylene (MDMO-PPV), fullerene derivatives, and/or fluorine copolymers. In one embodiment, the electron donor and acceptor materials may either be deposited as discrete layers or may be blended together during fabrication of the OPD 212.

Additionally, in certain embodiments, the OPD 212 may include hybrid structures that include both organic components such as poly-phenylene-vinylene derivatives, and inorganic nanocrystal materials such as cadmium selenide (CdSe) or zinc telluride (ZnTe). Additionally, the OPD 212 may also include sub-layers such as electron blocking layers, hole blocking layers, electron transport layers, and/or hole transport layers to facilitate production and transport of charged carriers between the first electrode 214 and the second electrode 216.

Moreover, in one embodiment, each pixel in the active layer corresponding to the TFT array backplane 202 may store the electrical charge that is generated by the OPD 212 during imaging. Further, the stored charge may be transferred from each pixel, for example, via readout electronics (not shown) that may be attached to a peripheral area of the TFT array backplane 202 for use in further processing and image reconstruction.

Particularly, in certain embodiments, the flow of electrical charge from the photodetector assembly 206 to the TFT array backplane 202 may be controlled via the first electrode 214 and/or the second electrode 216 in the photodetector assembly 206. Accordingly, in one embodiment, the first electrode 214 may be patterned or selectively deposited over each individual pixel in the 2D TFT array backplane 202. Alternatively, the first electrode 214 may be deposited over the TFT array backplane 202 as a thin film via physical vapor deposition, sputtering, or any other suitable fabrication technique. In certain embodiments, where the first electrode 214 is configured to operate as an anode, the first electrode 214 may be formed using materials such as, but are not limited to, aluminum (Al), silver (Ag), gold (Au), platinum (Pt), metal oxides such as indium tin oxide (ITO), indium zinc oxide (IZO), zinc oxide (ZO), and/or organic conductors such as p-doped conjugated polymers like poly (3,4-ethylenedioxythiophene), which is also known as PEDOT.

Additionally, in certain embodiments, a second electrode 216 may be fabricated on the TFT array backplane 202, for example, using techniques that have been discussed hereinabove with reference to fabrication of the first electrode 214. Further, in an exemplary implementation, the second electrode 216 may correspond to a cathode. Accordingly, in one embodiment, the second electrode 216 may include a semi-transparent conductive layer that has suitable energy levels to allow for efficient extraction of the electrical charges generated by the OPD 212 in response to the incident X-ray radiation. Particularly, the second electrode 216, for example, may include materials such as gold, silver, ITO, IZO, aluminum zinc oxide (AZO), tin oxide, titanium oxide, and/or any other suitable conductive metal oxide.

Further, in one embodiment, a barrier layer 218 to may be fabricated over the second electrode 216 to protect the OPD 212 and/or the underlying TFT array backplane 202 from degradation due to ambient factors. In one embodiment, the barrier layer 218 may have a thickness in a range from about 0.05 micron to about 50 microns. Additionally, the barrier layer 218 may include one or more layers of suitable materials that protect the OPD 212 from moisture and oxygen that is present in the ambient environment and/or is introduced during fabrication and/or operation of the overlying scintillator layer 208.

Particularly, in one embodiment, the barrier layer 218 may include at least one inorganic material adapted to keep moisture and oxygen away from underlying layers in the detector 200. The inorganic material, for example, may include silicon oxides, silicon nitrides, a metal oxide, and/or a metal nitride, where the metal is one of indium, tin, zinc, titanium, and aluminum. Thus, in one embodiment, the inorganic material in the barrier layer 218 may include indium tin oxide, silicon oxide, silicon nitride, and/or aluminum oxide. In another embodiment, the barrier layer 218 may include indium zinc oxide, silicon oxynitride, aluminum nitride, aluminum oxynitride, zinc oxide, indium oxide, tin oxide, cadmium tin oxide, cadmium oxide, and/or magnesium oxide.

Further, in certain embodiments, the barrier layer 218 may include an organic material in addition to the inorganic material. The organic material, for example, may include a parylene, a siloxane, a xylene, an alkene, a styrene, an organosilane, an organosilazane, and/or an organosilicone. Moreover, in certain embodiments, the barrier layer 218 may include two or more organic and/or inorganic layers to protect the underlying OPD 212 and/or the TFT array backplane 202. In such embodiments, the thickness of each individual layer in the barrier layer 218 may be selected to optimize performance of individual layers while maximizing the adhesion and flexibility of the barrier layer 218. For example, the thickness and material of each individual layer may be selected, for example, to allow transmission of at least about 85% of the visible light produced by the scintillator layer 208 towards the OPD 212.

As previously noted, the scintillator layer 208 may be configured to convert the incident X-ray radiation to optical photons. Accordingly, the scintillator layer 208 may be fabricated on top of the barrier layer 218 using a phosphor material that may be capable of converting the X-ray radiation to visible light. Certain examples of suitable materials corresponding to the scintillator layer 208 include cesium iodide (CsI), CsI with added thallium (CsI (Tl)), and/or terbium-activated gadolinium oxysulfide (GOS). In certain embodiments, the scintillator layer 208 may be available in the form of a screen or film, where the scintillator material is dispersed in a polymer film. Further, in one embodiment, the scintillator layer 207 may be attached to the second electrode 216 via a pressure sensitive adhesive (not shown).

Generally, it may be desirable for the detector 200 to have resistance to high annealing temperatures, high dimension stability, and low coefficient of thermal expansion (CTE) to minimize bowing of the thin glass substrate 204 when the detector 200 is subject to different temperatures. Accordingly, in certain embodiments, the thin glass substrate 204 may be bonded to a flexible substrate 220 such as a plastic substrate having a desired flexibility, dimension stability, and/or CTE. Particularly, the thin glass substrate 204 may be bonded to the flexible substrate 220 using an adhesive layer 222 to improve the stability and ruggedness of the detector 200. In certain embodiments, the flexible substrate 220 may be heat-stabilized before applying the adhesive layer 222 to minimize warping due to a mismatch in material properties of the thin glass substrate 204 and the flexible substrate 220.

In one embodiment, the flexible substrate 220, for example, may include polyethylene terephthalate (PET), polyethylene naphthalate (PEN), polyimide, polyaryletherketone (PEEK), and/or polycarbonate. Further, in certain embodiments, a first surface of the flexible substrate 220 that faces the adhesive layer 222 may be surface-treated or coated to promote the adhesion with the adhesive layer 222. Additionally, the first surface of the flexible substrate 220 may also include a barrier coating (not shown) to prevent moisture ingress that may cause premature delamination, and/or degradation of the adhesive layer 222. In certain embodiments, a second surface of the flexible substrate 220 opposite to the first surface and facing away from the TFT array backplane 202 and the photodetector assembly 206 may include one or more anti-scratch hard coatings (not shown) to prevent damage from mechanical contacts or occasional solvent exposure during the fabrication process, and/or during subsequent use. Furthermore, the second surface may also include a moisture barrier coating (not shown) to prevent moisture-induced damage to the flexible substrate 220, the adhesive layer 222, and/or to other components of the detector 200.

Moreover, in certain embodiments, the adhesive layer 222 may include permanent or temporary adhesives to appropriately bond the flexible substrate 220 to the thin glass substrate 204 to allow the thin glass substrate 204 to withstand different steps in the fabrication process at different temperatures. For example, a permanent adhesive that may survive the fabrication of the photodetector assembly 206 at temperatures of about 150° C. without causing premature debonding between the flexible substrate 220 and the thin glass substrate 204 may be selected to coat the thin glass substrate 204. Such permanent adhesives, for example, may include acrylic, epoxy, and/or silicone materials.

Alternatively, in certain embodiments, a temporary bonding adhesive that may operate based on thermal release, cold release, or mechanical release may be used as the adhesive layer 222 to appropriately bond the flexible substrate 220 to the thin glass substrate 204. For example, the temporary bonding adhesive may include Revalpha® adhesive tapes marketed by the Nitto Denko Company. In one embodiment, the temporary adhesives may be partially cured to provide a desired bonding strength that may allow mechanical release of the flexible substrate 220, when desired.

Furthermore, in certain embodiments, the adhesive layer 222 may be applied in a sheet or coating form on the thin glass substrate 204 and/or the flexible substrate 220. For example, the sheet of the adhesive layer 222 may initially be coated or laminated onto the flexible substrate 220 followed by laminating the glass substrate 204 with TFT array backplane 202. In one example, various coating methods such as screen-printing, blade coating, and/or extrusion may be used to apply the adhesive layer 222 onto the flexible substrate 220. Additionally, in certain embodiments, thermal and/or ultraviolet (UV) curing may be employed to activate the adhesive layer 222 before bonding the different surfaces of the flexible substrate 220 and/or the thin glass substrate 204.

Once the TFT array backplane 202, the photodetector assembly 206, the scintillator layer 208, and the flexible substrate 220 have been deposited, and properly packaged to prevent exposure to ambient factors, the readout electronics may be bonded to one or more edges of the TFT array backplane 202 to form the detector 200. Further, the detector 200 may be assembled into a desired product enclosure such as a charge coupled device, a portable imaging system, and/or a radiographic imaging system.

Thus, according to certain aspects of the present specification, the flexible detector 200 may be fabricated using the present method to mitigate known shortcomings of conventional fabrication of flexible detectors. Particularly, in certain embodiments of the present method, the flexible detector 200 may be fabricated by performing the high temperature TFT deposition (about 200° C.) on the glass substrate 204 having conventional thickness (about 0.5-1.0 mm) Subsequently, the glass substrate 204 may be thinned. Furthermore, one or more layers in the photodetector assembly 206 may be deposited at a lower temperature (about 150° C.) over the thin glass substrate 204 to produce a flexible yet durable detector 200. Certain exemplary embodiments of the enhanced method for fabricating the flexible detector 200 that may be advantageously used to improve detector performance will be described in greater detail with reference to FIGS. 3-4.

Figure 3:
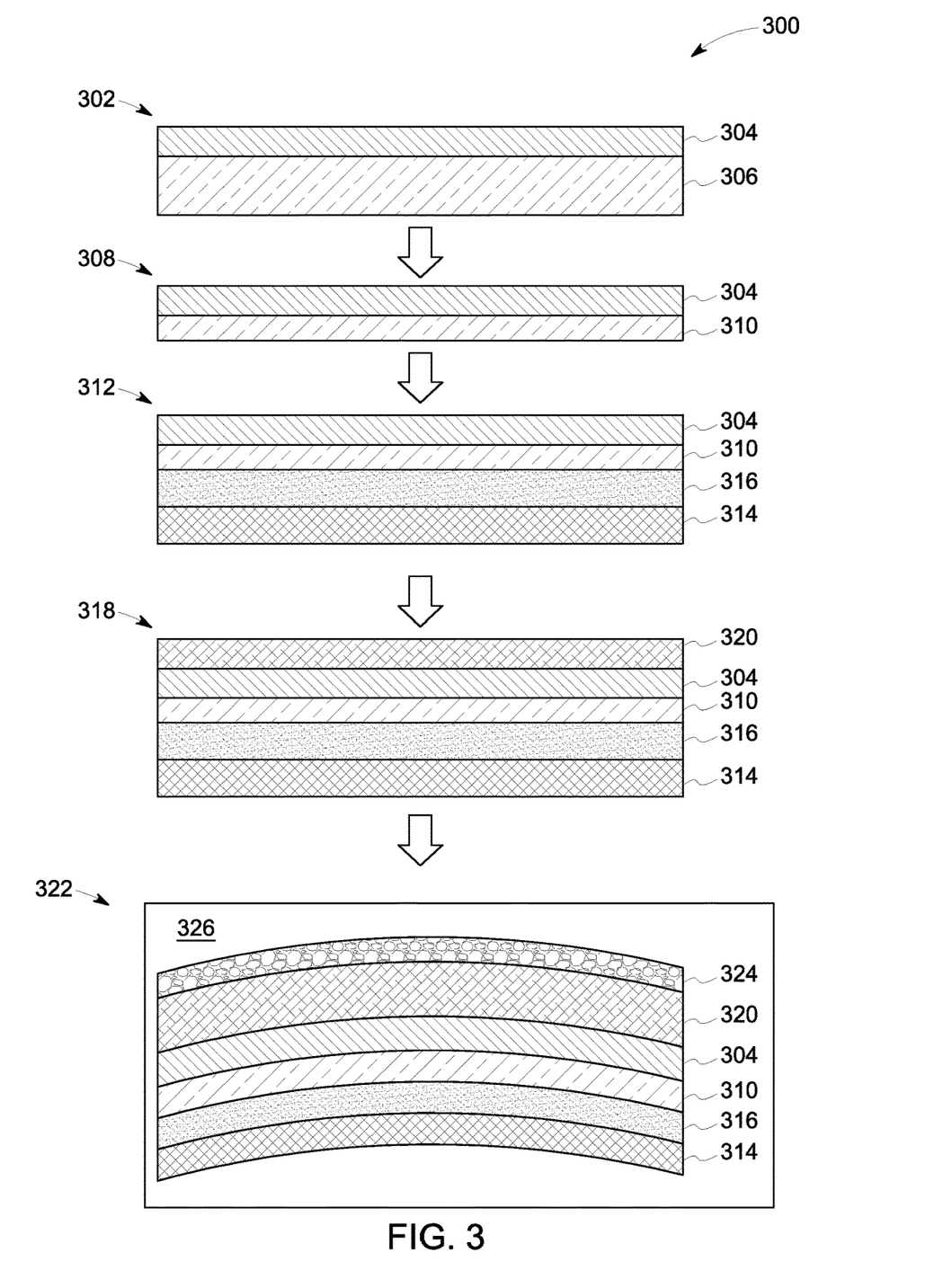
FIG. 3 is a flow diagram depicting an exemplary method for fabricating a digital X-ray detector, in accordance with aspects of the present specification.

FIG. 3 illustrates a schematic flow diagram 300 that depicts an exemplary method for fabricating a flexible organic X-ray detector. Further, in FIG. 3, the exemplary method is illustrated as a collection of blocks in a logical flow chart to illustrate the functions that are performed in the exemplary method. The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method or augmented by additional blocks with added functionality without departing from the spirit and scope of the subject matter described herein. For discussion purposes, the exemplary method will be described with reference to the elements of FIGS. 1-2.

Conventional fabrication of an organic photodetector on a flexible plastic substrate leads to significant CTE induced strain mismatch during TFT processing due to a relatively high CTE for flexible plastic substrates. Particularly, the CTE induced strain mismatch may cause significant distortion, which in turn, may lead to handling errors, photolithographic alignment errors, and/or line and layer defects. Alternatively, fabricating the TFT array on a glass substrate with a thickness of about 0.5 mm to about 1.1 mm results in higher weight, while also limiting the flexibility of the X-ray detector.

Embodiments of the present method mitigate these and other shortcomings of conventional methods for fabricating the flexible organic X-ray detector. The method begins at step 302, where a TFT array 304 is fabricated on a glass substrate 306. Particularly, the TFT array 304 may be disposed on the glass substrate 306 having a conventional thickness of about 0.5 mm to about 1.1 mm, for example, using chemical vapor deposition, physical vapor deposition, photolithography, and/or other semiconductor device process steps. Generally, the TFT fabrication includes process steps that are performed at temperatures greater than 200° C. The TFT array 304, thus, may be optimally fabricated over substrates that exhibit high dimension stability and flatness during the high temperature TFT fabrication process. Accordingly, in one embodiment, the TFT array 304 may initially be disposed on the thicker glass substrate 306 to allow for greater stability of the detector during the high temperature TFT fabrication process.

Subsequent to the fabrication of the TFT array 304 on the glass substrate 306, at step 308, the glass substrate 306 may be thinned, for example, to a thickness in a range from about 0.05 to about 0.2 mm. Particularly, the glass substrate 306 may be thinned using chemical agents and/or mechanical means to generate a thinned glass substrate 310. In certain embodiments, thinning the glass substrate 306 using the chemical agents, for example, entails chemically etching the glass substrate 306 using hydrofluoric acid. Further, thinning the glass substrate 306 using mechanical means includes grinding or polishing the glass substrate 306 until a desired thickness is achieved. Particularly, in one embodiment, the glass substrate 306 may be thinned to a desired thickness so as to reduce weight of the overall detector, while providing a desired radius of curvature and stability. However, in certain embodiments, the present method may also allow for flattening of the detector using vacuum chuck for use in devices that employ flat detectors.

Further, at step 312, the TFT array 304 that is fabricated on the thin glass substrate 310 may be bonded to a flexible substrate 314 via an adhesive 316. Particularly, the thin glass substrate 310 may be bonded to the flexible substrate 314 to improve the stability and ruggedness of the detector. In one embodiment, the flexible substrate 314, for example, may include PET, PEN, polyimide, PEEK, and/or polycarbonate materials. Further, the adhesive 316 may include a permanent or temporary adhesive that may be used to appropriately bond the flexible substrate 314 to the thin glass substrate 310 to withstand different steps and different annealing temperatures during the TFT fabrication process. Accordingly, in certain embodiments, the permanent adhesives 316, for example, may include acrylic, epoxy, and/or silicone materials. Additionally, the temporary adhesives 316, for example, may include Revalpha® adhesive tapes. In order to minimize warping due to a mismatch in material properties of the thin glass substrate 310 and the flexible substrate 314, in certain embodiments, the flexible substrate 314 may be heat-stabilized before applying the adhesive 316.

Subsequently, in one embodiment, the adhesive 316 may be applied in a sheet or coating form on the thin glass substrate 310 and/or the flexible substrate 314 using coating methods such as screen-printing, blade coating, and/or extrusion. Moreover, in certain embodiments, one or more bonding surfaces of the thin glass substrate 310 and/or the flexible substrate 314 may be surface treated to aid in bonding. Additionally, the adhesive 316 may be activated, for example, via thermal and/or UV curing to aid in bonding of the different surfaces. Furthermore, in one embodiment, a first surface of the flexible substrate 314 that faces the adhesive 316 may be surface-treated or coated to promote the adhesion with the permanent or temporary adhesive 316. Additionally, a barrier coating (not shown) may also be applied to the first surface to prevent moisture ingress that may cause premature delamination, and/or degradation of the adhesive 316 and/or the thin glass substrate 310.

Moreover, in certain embodiments, anti-scratch coatings may be applied to a second surface of the flexible substrate 314 that is opposite to the first surface and faces away from the TFT array 304. Specifically, the anti-scratch coatings may be applied to prevent damage to the detector from mechanical contact or solvent exposure during the fabrication process, and/or during subsequent use of the detector. Furthermore, the second surface may also include a moisture barrier coating to prevent moisture-induced damage to the flexible substrate 314, the adhesive 316, or to other components of the detector.

In one embodiment, bonding the flexible substrate 314 to the thin glass substrate 310 including the TFT array 304 provides mechanical support to the thin glass substrate 310, and thus, prevents an exposed side of the detector from being damaged during the subsequent OPD process steps. Further, use of a flexible substrate 314 maintains the flexibility of the detector, thereby precluding any need to debond the flexible substrate 314 after fabrication of the detector. Moreover, flatness of the flexible detector may still be maintained, for example, by holding the detector through a vacuum chuck during the OPD process steps. However, in certain embodiments, debonding of the flexible substrate 314 may be possible via use of the temporary adhesive 316 when the detector 310 is assembled into certain product enclosures.

Further, at step 318, an OPD 320 may be disposed on the TFT array 304. Additionally, a plurality of other layers (not shown in FIG. 3) such as a first electrode, an absorber layer, a second electrode, a barrier layer, and/or any other desired layers, such as the layers described with reference to the photodetector assembly 206 of FIG. 2, may be deposited on the TFT array 304.

Subsequent to the OPD fabrication, at step 322, a scintillator layer 324 may be disposed on the one or more layers corresponding to the OPD 320, thus resulting in a flexible organic detector 326. As previously noted, the scintillator layer 324 may be configured to convert the incident X-ray radiation to optical photons. Particularly, the scintillator layer 324 may include a phosphor material that may be capable of converting the X-ray radiation to visible light. Certain examples of suitable materials corresponding to the scintillator layer 324 include CsI, CsI (Tl), and/or terbium-activated GOS. In certain embodiments, the scintillator layer 324 may be available in the form of a screen or film, where the scintillator material is dispersed in a polymer film. Alternatively, the scintillator layer 324 may be attached to the OPD 320 via a pressure sensitive adhesive such that the scintillator layer 324 is positioned adjacent to the OPD layers 320 in the detector 326.

Positioning the scintillator layer 324 adjacent to the OPD layers 320 prevents undesirable scattering of light, thus allowing for more efficient extraction of electrical signals, and better detection efficiency. Although FIG. 3 depicts the detector 326 as a curved detector, in other embodiments, the detector 326 may be flattened, for example using a vacuum chuck, and assembled into a desired product enclosure. Particularly, the flexible organic detector 326 may be operatively coupled into a charge-coupled device, a portable imaging system, and/or a radiographic imaging system to aid in imaging desired ROIs of the subject.

Figure 4:
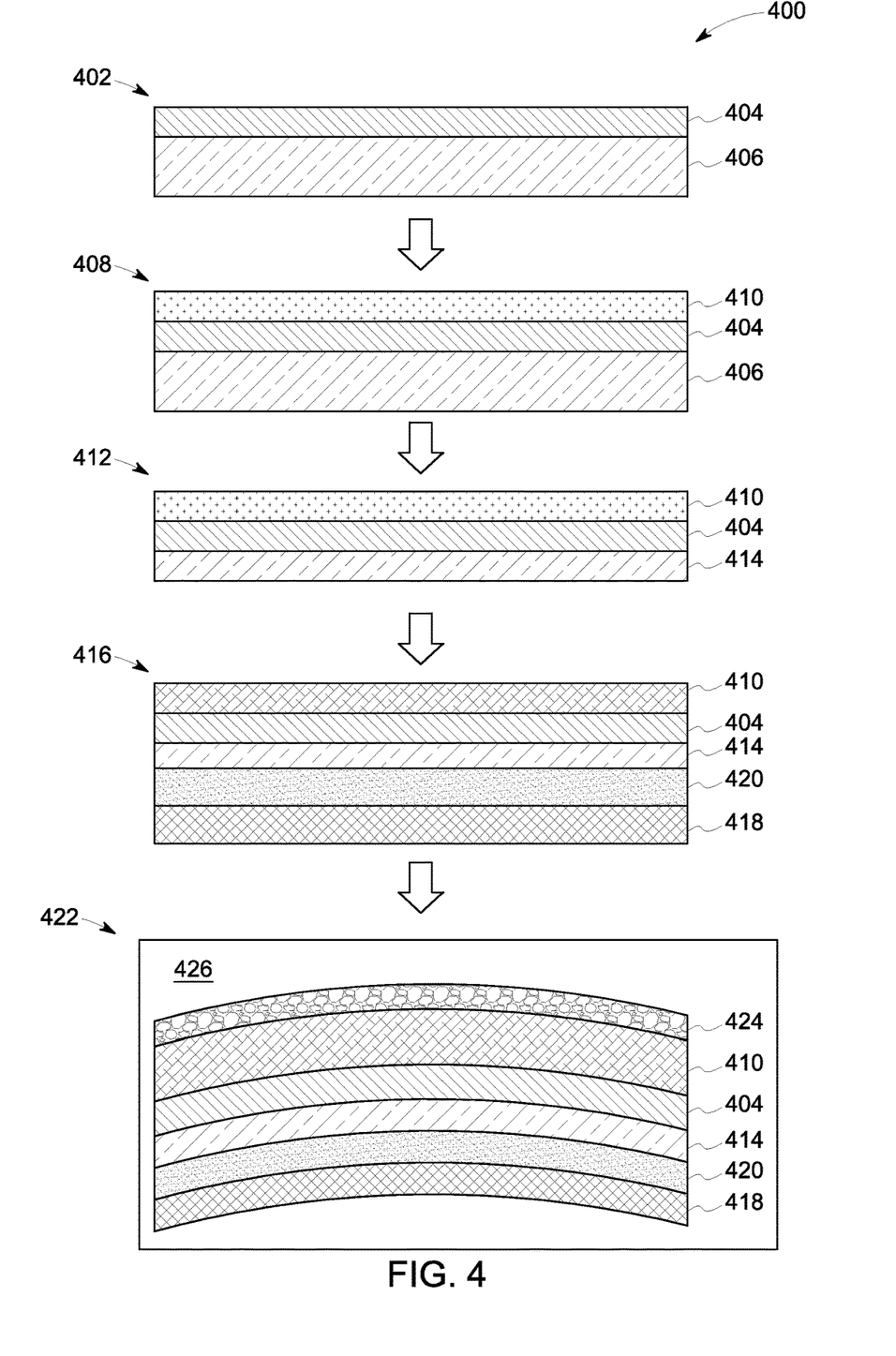
FIG. 4 is a flow diagram depicting another exemplary method for fabricating a digital X-ray detector, in accordance with aspects of the present specification.

Further, FIG. 4 illustrates a schematic flow diagram 400 that depicts another exemplary method for fabricating a flexible organic detector. It may be noted that one or more steps of the method depicted in FIG. 4 may be implemented in the same manner as described with reference to FIG. 3. However, an order of fabricating the various layers of the detector described in the present method is different from the method of fabrication described with reference to FIG. 3.

An embodiment of the present method begins at step 402, where a TFT array 404 is fabricated on a glass substrate 406, as described with reference to step 302 of FIG. 3. Further, at step 408, one or more OPD layers 410 may be disposed on the TFT array 404, as described with reference to step 318 of FIG. 3. Subsequently, at step 412, the glass substrate 406 may be thinned, as described with reference to step 308 of FIG. 3 to produce a thin glass substrate 414. Specifically, in one embodiment, the glass substrate 406 may be thinned using chemical means, for example via chemical etching using hydrofluoric acid, to prevent damage and maintain dimension stability of the TFT array 404 and the OPD layers 410 disposed thereon to form the thin glass substrate 414.

Further, at step 416, the OPD layers 410 and the TFT array 404 disposed on the thin glass substrate 414 may be bonded to a flexible substrate 418 via an adhesive 420, as described with reference to step 312 of FIG. 3. Subsequently, at step 422, a scintillator layer 424 may be disposed on the OPD layers 410, as described with reference to step 322 of FIG. 3 to form a flexible organic detector 426. As previously noted, the flexible organic detector 426 may either be used as a curved detector or may be flattened when it may be desirable to use a flat detector. Moreover, in certain embodiments, the detector 426 may include readout electronic circuitry (not shown) that is attached to one or more edges of the TFT array 404 to allow for measurement and/or digitization of image data acquired from a target object by the detector.

Particularly, embodiments of the digital X-ray detector and the corresponding methods of fabrication as described herein provide a flexible yet robust detector that may conform to a target object having a desired shape and/or size for imaging an internal structure of the target object. By way of example, the flexible detector may be used to acquire projection data corresponding to a patient, a baggage, a pipeline, a fuselage, an airframe, and/or other difficult to access areas of the target object.

Further, use of the present embodiments allows for production of a flexible digital X-ray detector by optimally combining a TFT fabrication process having stringent requirements such as dimension stability, flatness, and/or ability of withstand high annealing temperatures (>200° C.) with a less stringent OPD process. Additionally, thinning the glass substrate subsequent to the TFT fabrication and bonding the thinned glass substrate to a flexible plastic substrate via an adhesive reduces weight and imparts desired flexibility and ruggedness to the detector. Particularly, bonding the flexible substrate reinforces the mechanical stability of the thin glass substrate, thereby aiding in preventing damage and/or providing more efficient mechanical handling of the resulting detector module during fabrication and/or subsequent operation. Moreover, positioning the subsequently disposed OPD layers adjacent to a scintillator layer prevents scattering of light, thereby improving a detection efficiency of the resulting flexible detector.

It may be noted that although specific features of various embodiments of the present systems and methods may be shown in and/or described with respect to only certain drawings and not in others, this is for convenience only. It is to be understood that the described features, structures, and/or characteristics may be combined and/or used interchangeably in any suitable manner in the various embodiments, for example, to construct additional assemblies and techniques.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A flexible organic X-ray detector having a layered structure, comprising:
   a flexible substrate;
   a thin glass substrate operatively coupled to the flexible substrate by way of a permanent adhesive, a temporary adhesive, or a combination thereof;
   a thin film transistor array disposed on the thin glass substrate;
   an organic photodiode comprising one or more layers disposed on the thin film transistor array; and
   a scintillator layer disposed on the organic photodiode;
   wherein the organic photodiode comprises one or more materials that produce charged carriers between a first electrode and a second electrode following conversion of incident X-ray radiation to optical photons by the scintillator layer, such that the organic photodiode includes at least one electron donor material and an electron acceptor material.

2. The flexible organic X-ray detector of claim 1, wherein a thickness of the thin glass substrate is in a range from 0.05 millimeters to 0.2 millimeters.

3. The flexible organic X-ray detector of claim 1, wherein the flexible substrate comprises a polymer.

4. The flexible organic X-ray detector of claim 3, wherein the flexible substrate comprises polyethylene terephthalate, polyethylene naphthalate, polyimide, polyaryletherketone, polycarbonate, or combinations thereof.

5. The flexible organic X-ray detector of claim 3, wherein a thickness of the flexible substrate is in a range from 0.01 millimeters to 10 millimeters.

6. The flexible organic X-ray detector of claim 1, wherein the adhesive layer comprises an acrylic material, an epoxy material, a silicone material, or combinations thereof.

7. The flexible organic X-ray detector of claim 1, wherein a thickness of the adhesive layer is in a range from 2 microns to 50 microns.

8. The flexible organic X-ray detector of claim 1, wherein the one or more layers corresponding to the organic photodiode comprise a first electrode and a second electrode disposed on the thin film transistor array.

9. The flexible organic X-ray detector of claim 1, wherein the flexible substrate comprises a first surface operatively coupled to the thin glass substrate and comprising a barrier layer to prevent moisture ingress into the organic X-ray detector, a second surface positioned on an opposite side of the first surface and comprising one or more of an anti-scratch coating and a barrier layer, or a combination thereof.

10. The flexible organic X-ray detector of claim 9, wherein a thickness of the barrier layer of the first surface or the barrier layer of the second surface is in a range from 0.05 microns to 50 microns.

11. The flexible organic X-ray detector of claim 1, wherein the flexible organic X-ray detector is conformable to a target object having a desired shape, a desired size, or a combination thereof.

12. A method for fabricating an organic X-ray detector having a layered structure, comprising:
   fabricating a thin film transistor array on a glass substrate;
   thinning the glass substrate to create a thin glass substrate;
   bonding the thin glass substrate to a flexible substrate, wherein the step of bonding utilizes a permanent adhesive, a temporary adhesive, or a combination thereof;
   disposing an organic photodiode comprising one or more layers on the thin film transistor array; and
   disposing a scintillator layer on the organic photodiode;
   wherein the organic photodiode comprises one or more materials that produce charged carriers between a first electrode and a second electrode following conversion of incident X-ray radiation to optical photons by the scintillator layer, such that the organic photodiode includes at least one electron donor material and an electron acceptor material that are blended together during fabrication of the organic photodiode.

13. The method of claim 12, wherein thinning the thin glass substrate comprises applying chemical means, mechanical means, or a combination thereof, to thin the glass substrate having the thin film transistor array disposed thereon.

14. The method of claim 12, wherein bonding the thin film transistor array disposed on the thin glass substrate to the flexible substrate comprises applying the permanent adhesive, the temporary adhesive, or a combination thereof, to one or more surfaces corresponding to the thin glass substrate, the thin film transistor array, or a combination thereof.

15. The method of claim 12, further comprising stabilizing the flexible substrate using heat before bonding the thin film transistor array disposed on the thin glass substrate to the flexible substrate.

16. The method of claim 12, wherein the step of bonding; utilizes a temporary adhesive, the method further comprises removing the flexible substrate from the thin glass substrate before packaging the organic X-ray detector.

17. A method for fabricating an organic X-ray detector having a layered structure, comprising:
   disposing a thin film transistor array on a glass substrate;
   disposing an organic photodiode comprising one or more layers on the thin film transistor array;
   thinning the glass substrate having the thin film transistor array and the organic photodiode disposed thereon;
   bonding the thin glass substrate to a plastic substrate; and
   disposing a scintillator layer on the organic photodiode;
   wherein the organic photodiode comprises one or more materials that produce charged carriers between a first electrode and a second electrode following conversion of incident X-ray radiation to optical photons by the scintillator layer, such that the organic photodiode includes at least one electron donor material and an electron acceptor material that are blended together during fabrication of the organic photodiode.

18. An imaging system for imaging a subject, comprising:
   an organic X-ray detector configured to acquire imaging data from a target volume in the subject, wherein the organic X-ray detector comprises:
   a flexible substrate;
   a thin glass substrate operatively coupled to the flexible substrate by way of a permanent adhesive, a temporary adhesive, or a combination thereof;
   a thin film transistor array disposed on the thin glass substrate;
   an organic photodiode comprising one or more layers disposed on the thin film transistor array;
   a scintillator layer disposed on the organic photodiode; and
   a processing subsystem configured to reconstruct an image of the subject based on the acquired imaging data;
   wherein the organic photodiode comprises one or more materials that produce charged carriers between a first electrode and a second electrode following conversion of incident X-ray radiation to optical photons by the scintillator layer, such that the organic photodiode includes at least one electron donor material and an electron acceptor material that are blended together during fabrication of the organic photodiode.

19. The imaging system of claim 18, wherein the imaging system is an X-ray projection imaging system, an X-ray diffraction system, a microscope, a digital camera, a charge-coupled device, or combinations thereof.

* * * * *